(No Model.) 2 Sheets—Sheet 1.

E. FOX.
VEHICLE PROPELLED BY ELECTRICITY.

No. 281,859. Patented July 24, 1883.

Witnesses
Harold Serrell
J. Haib

Inventor
Edward Fox
per Lemuel W. Serrell
atty (No Model.) 2 Sheets—Sheet 2.

E. FOX.
VEHICLE PROPELLED BY ELECTRICITY.

No. 281,859. Patented July 24, 1883.

Witnesses
Harold Serrell
J Staib

Inventor
Edward Fox
per
Lemuel W. Serrell
atty

UNITED STATES PATENT OFFICE.

EDWARD FOX, OF BROOKLYN, NEW YORK, ASSIGNOR TO HIMSELF AND ANDREW ALBRIGHT, OF NEWARK, NEW JERSEY.

VEHICLE PROPELLED BY ELECTRICITY.

SPECIFICATION forming part of Letters Patent No. 281,859, dated July 24, 1883.

Application filed February 5, 1883. (No model.)

*To all whom it may concern:*

Be it known that I, EDWARD FOX, of Brooklyn, in the county of Kings and State of New York, have invented a certain Improvement in Vehicles Propelled by Electricity; and the following is declared to be a description of the same.

The object of this invention is to provide a means by which electricity can be applied to either a road-wagon, tramway-car, horse-car, or railway-car without the use of cumbersome intermediate gearing. I provide a magneto-electric motor, and support the same from the body or frame of the vehicle, and I operate said motor by the electricity contained in a storage-battery carried in the vehicle. It may, however, be operated by the electricity conveyed by stationary wires and transmitted to the vehicle through the medium of a traveling carriage upon the wires. The end of the armature-shaft of my magneto-electric motor is made as a worm-pinion, and it operates in a worm-wheel upon the axle of the car-wheels, and the speed of said motor is thereby reduced sufficiently to make it available for driving the vehicle. This is especially applicable to railway-carriages and street-cars. In the case of street-cars or tramway-cars I employ the same direct connection of a worm-pinion on the shaft of the armature acting upon a wheel to which is connected a band-wheel or pulley with a belt to a wheel on the driving-axle of the vehicle. In employing electricity for propelling a road-wagon I make use of endless bands or ropes passing around the driving and traction wheels, and said bands or ropes serve as tracks upon which the wheels run, and I use pulleys and wheels to give the leverage required to enable the motor to move the load. I also provide for shifting the front axle from side to side to a limited extent through the intervention of a lever or a toothed segment and worm, so as to facilitate turning the vehicle round a curve; and I provide guides over the wheels to keep the ropes or bands from running out of the grooved fellies of the traction-wheels. The magneto-electric motor for driving the road-wagon or tramway-car may be directly connected by worm and worm-wheel to the shaft of the second pair of wheels, or to the shaft of the front wheels by belt and pulleys.

Figure 1:
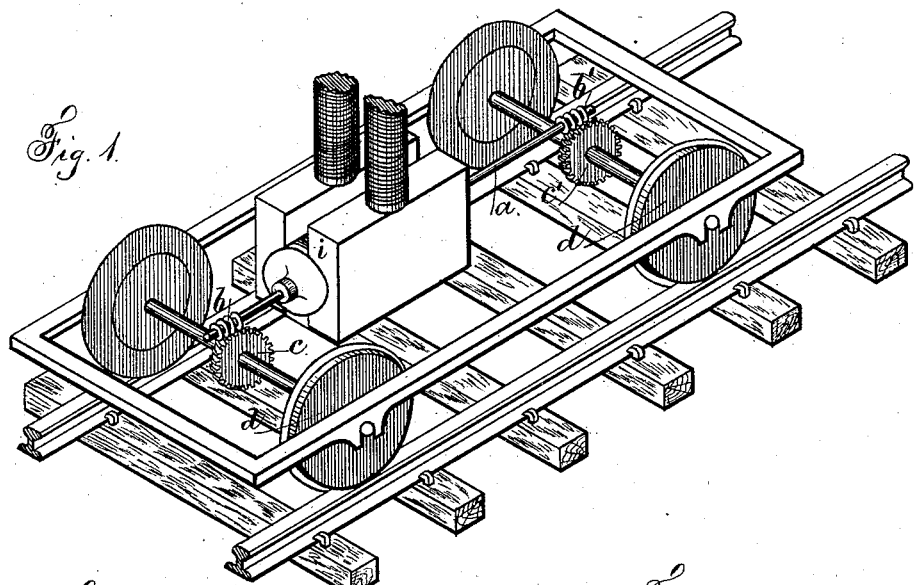
Figures 2, 6:
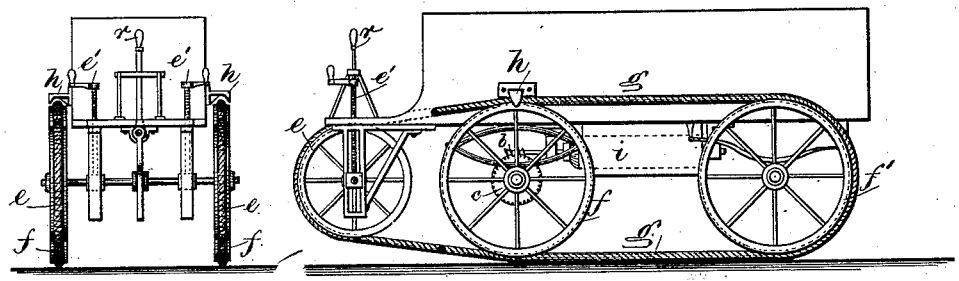
Figure 3:
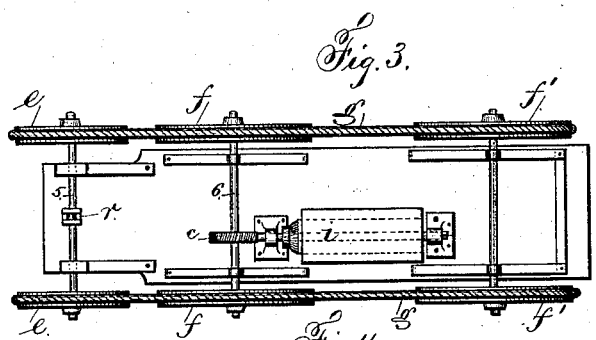
Figure 4:
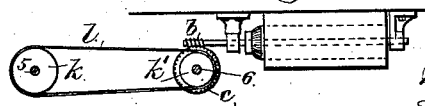
Figure 5:
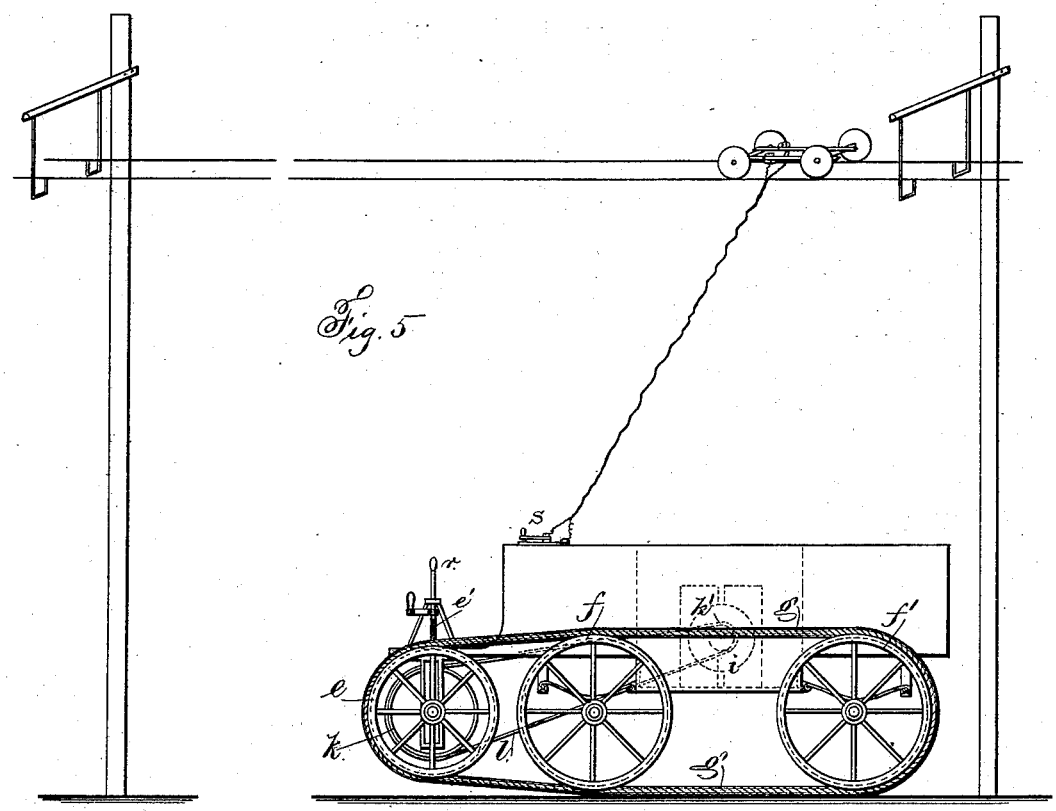

In the drawings, Figure 1 is a perspective view of my magneto-electric motor as applied to a railway-car. Fig. 2 is an elevation of a road-wagon as operated by my motor. Fig. 3 is an inverted plan of the same. Fig. 4 is a detached view of the motor and a band-connection to the front wheels. Fig. 5 is an elevation of a road-wagon and the connections to an elevated conductor, and Fig. 6 shows the front wheels and lever for moving them transversely of the wagon.

The magneto-electric motor illustrated in Fig. 1 is secured to the frame of a railway-car, and the shaft $a$ of its armature has the worm pinion or pinions $b\ b'$, which mesh into the worm wheel or wheels $c\ c'$ upon the axles of the car-wheels $d$, and the worm-pinion and worm-wheel so reduce the speed that it is possible to impart to said wheels a satisfactory rate of revolution, and obtain from the rapidly-revolving armature the necessary power and slower speed for moving the car.

The road-wagon illustrated in Figs. 2 and 3 is similar to any ordinary road-wagon body; but it is provided with axles and four traction-wheels. I also provide in the front of this wagon or tramway-car a frame carrying a pair of wheels, $e$, and their axle, and I make these adjustable, so that they can be raised and lowered and moved from side to side by any suitable mechanism operated by an attendant upon the front platform of the wagon. The boxes of this axle are represented in vertical slides, so as to be raised or forced down by the screws $e'$, that act upon the boxes, and in so doing the front pair of wheels are either raised from the ground or forced down upon the same. These screws are easy of access to the driver. He is also provided with a lever, $r$, pivoted upon the platform, and having a fork at its lower end, passing in between collars upon the axle, or else made with teeth at its lower end to act upon numerous collars around the axle, to move the same endwise in either direction. The wheels $e$ and the traction-wheels $f\ f'$ have grooved fellies, and the endless bands or ropes *g* pass around them, and I provide guides *h*, that keep the ropes or bands *g* from leaving the felly of the wheels *f*, as shown, such guides *h* projecting from the side of the wagon and including the upper part of the wheels *f* when the ropes pass over the same. Power is communicated from the magneto-electric motor *i* by direct connection of worm, pinion, and wheel, as before described, to the axle of the wheels *f*; or it may be communicated by pulleys *k k'* and belt or chain *l* to the wheels *e*, and they in turn revolve the band or rope *g* and traction-wheels *f f'*, and so move the vehicle forward.

In the operation of this vehicle I may use the wheels *e* either as raised above the ground or depressed to rest upon the ground. When the wheels *e* and their axle are moved to one side, the band or ropes *g* form a curved track, and the tendency of the wheels *f* is to follow this curved track as it is laid, and so the vehicle moves in a curved line when its direction of motion is to be changed; or the wheels *f* may be turned on a fifth-wheel or king-bolt to aid them in following the curved track formed by the ropes or bands *g* in changing the direction of motion of the vehicle.

The body of the vehicle is provided with the necessary space for holding the magneto-electric motor, and it may also hold a storage-battery; but this latter will not be required where the electricity is supplied from an elevated conductor, as seen in Fig. 5. A wire passes from the elevated conductor and traveler to the switch *s*, near the driver, and thence through the electric motor to the track and earth-circuit, or else there is a return-wire to a second elevated conductor, so that the driver can by the switch stop or start the motor and car, or regulate the speed thereof by increasing or decreasing the flow of the electric current to the magneto-motor.

I am aware that it is not new to employ a storage-battery to operate a magneto-electric motor, or a motor to operate or propel a car or wagon through the medium of complicated gearing; and I am also aware that endless bands or tracks are used on traction-engines, &c.

In cases where the magneto-motor acts by a worm-pinion, *b*, upon the wheel *c*, and there is a pulley, *k'*, and belt to the pulley *k* on the shaft 5, (see Fig. 4,) it will be necessary to allow the pulley *k'* and wheel *c* on the shaft 6 to turn independently on the shaft.

I claim as my invention—

1. In a vehicle employing electricity as a motive power, the combination, with the magneto-electric motor, the worm-pinion *b*, and wheel *c*, of the driving-wheels *f f'* and bands or ropes *g*, substantially as set forth.

2. The combination, with the wagon or car and its traction-wheels *f f'* and band or ropes *g*, of the wheels *e*, and mechanism for moving said wheels *e* up or down and shifting them sidewise, and the means for imparting motion to the vehicle, substantially as set forth.

3. The combination of the driving-wheels having grooved peripheries, and the endless bands or ropes passing around the same, with a magneto-motor, the axis of the armature of which is at right angles to the axle of the driving-wheels, a worm-pinion on the said armature-axis, a wheel on the axle of the driving-wheel, into which said worm-pinion gears directly, an elevated conductor and traveler for supplying electricity, and switch under the control of the attendant, substantially as and for the purposes set forth.

Signed by me this 2d day of February, A. D. 1883.

EDWARD FOX.

Witnesses:
GEO. T. PINCKNEY,
WILLIAM G. MOTT.